United States Patent
Bogomolny

[11] Patent Number: 5,984,294
[45] Date of Patent: Nov. 16, 1999

[54] CUTTING BOARD WITH REPLACEABLE CUTTING SURFACE

[76] Inventor: Edward Bogomolny, 844 Harwood Ct., Mayfield Village, Ohio 44040

[21] Appl. No.: 09/040,752

[22] Filed: Mar. 18, 1998

[51] Int. Cl.$^6$ ............................................. B25B 11/00
[52] U.S. Cl. ................................ 269/289 R; 269/307
[58] Field of Search .................... 269/289 R, 302.1, 269/286, 13

[56] References Cited

U.S. PATENT DOCUMENTS

| | | |
|---|---|---|
| 12,153 | 1/1855 | Leigh ............................ 269/302.1 |
| 488,172 | 12/1892 | Kinsman ........................ 269/302.1 |
| 1,151,895 | 8/1915 | Mix . |
| 1,212,040 | 2/1917 | Fletcher . |
| 1,583,512 | 5/1926 | Worth . |
| 1,627,051 | 5/1927 | Moore . |
| 2,053,949 | 9/1936 | Emery . |
| 2,094,257 | 9/1937 | Luck et al. . |
| 2,170,040 | 8/1939 | Stuart . |
| 3,106,236 | 10/1963 | Brady . |
| 3,385,357 | 5/1968 | Burg . |
| 3,698,594 | 10/1972 | Boehlert . |
| 3,989,158 | 11/1976 | Florian . |
| 4,116,426 | 9/1978 | Kessler ............................ 269/307 |
| 4,722,442 | 2/1988 | Smith . |
| 4,798,372 | 1/1989 | Tingle . |
| 4,800,845 | 1/1989 | Budd . |
| 5,193,793 | 3/1993 | Pollock . |
| 5,423,451 | 6/1995 | Snyder . |
| 5,472,790 | 12/1995 | Thompson ........................ 428/500 |
| 5,485,937 | 1/1996 | Tseng . |
| 5,560,288 | 10/1996 | Licari . |
| 5,595,110 | 1/1997 | Tseng . |

*Primary Examiner*—David A. Scherbel
*Assistant Examiner*—Daniel G. Shanley
*Attorney, Agent, or Firm*—Fay, Sharpe, Fagan Minnich & McKee

[57] ABSTRACT

A cutting board assembly comprises a rigid base member and a selectively removable surface layer. Both the base member and the surface layer are composed of a material suited for food service. The base has a flat level upper surface. The selectively removable skin layer is received over the base to provide a replaceable cutting surface thereto. The surface includes a downwardly extending skirt to provide a snug fit about the perimeter of the base. A curb extends upwardly from the cutting surface adjacent an outer edge thereof to provide a trap for inhibiting food or juices from sliding off the cutting surface. At least a portion of the cutting surface outer edge is free of the curb to enable the sliding transfer of food to and from the surface.

19 Claims, 3 Drawing Sheets

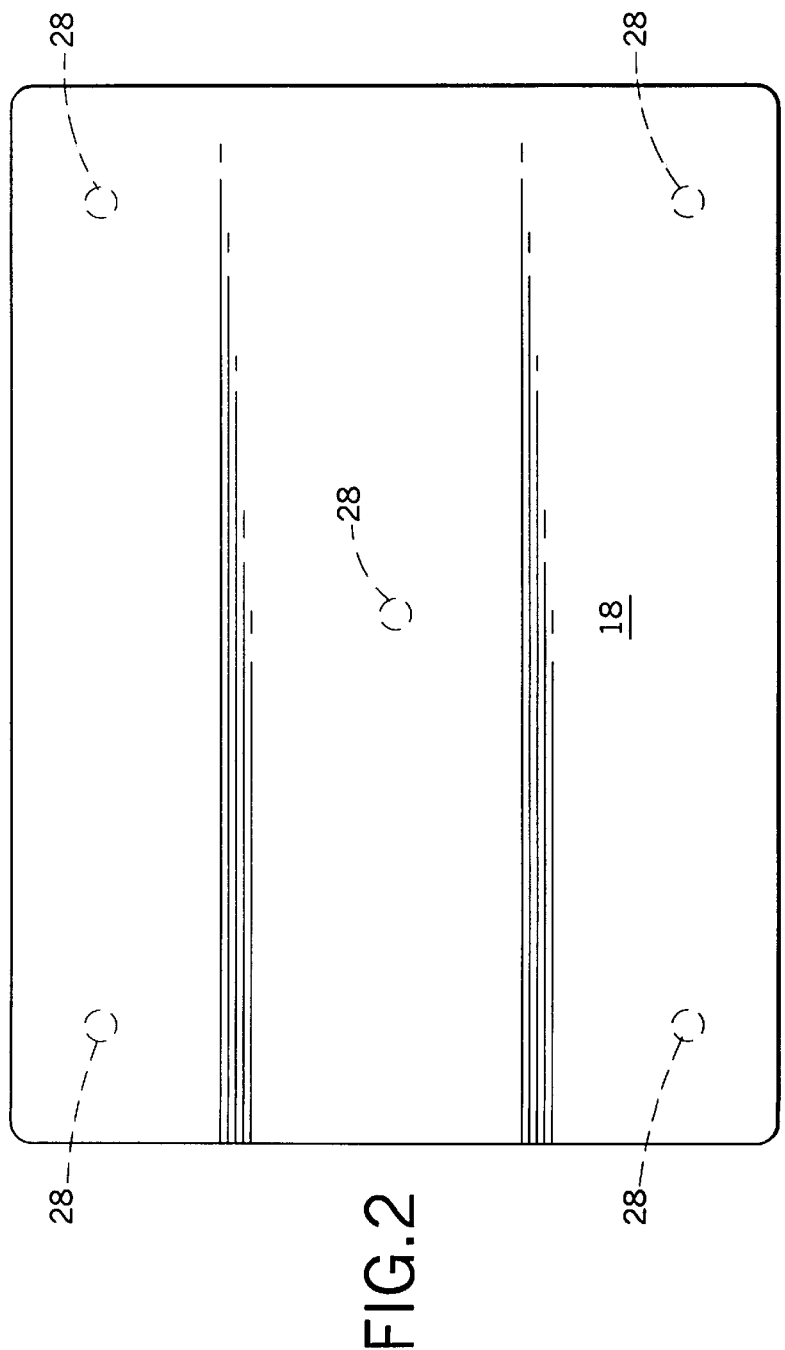

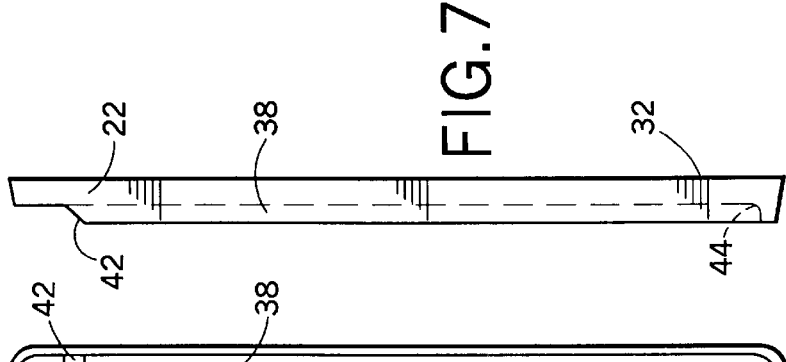
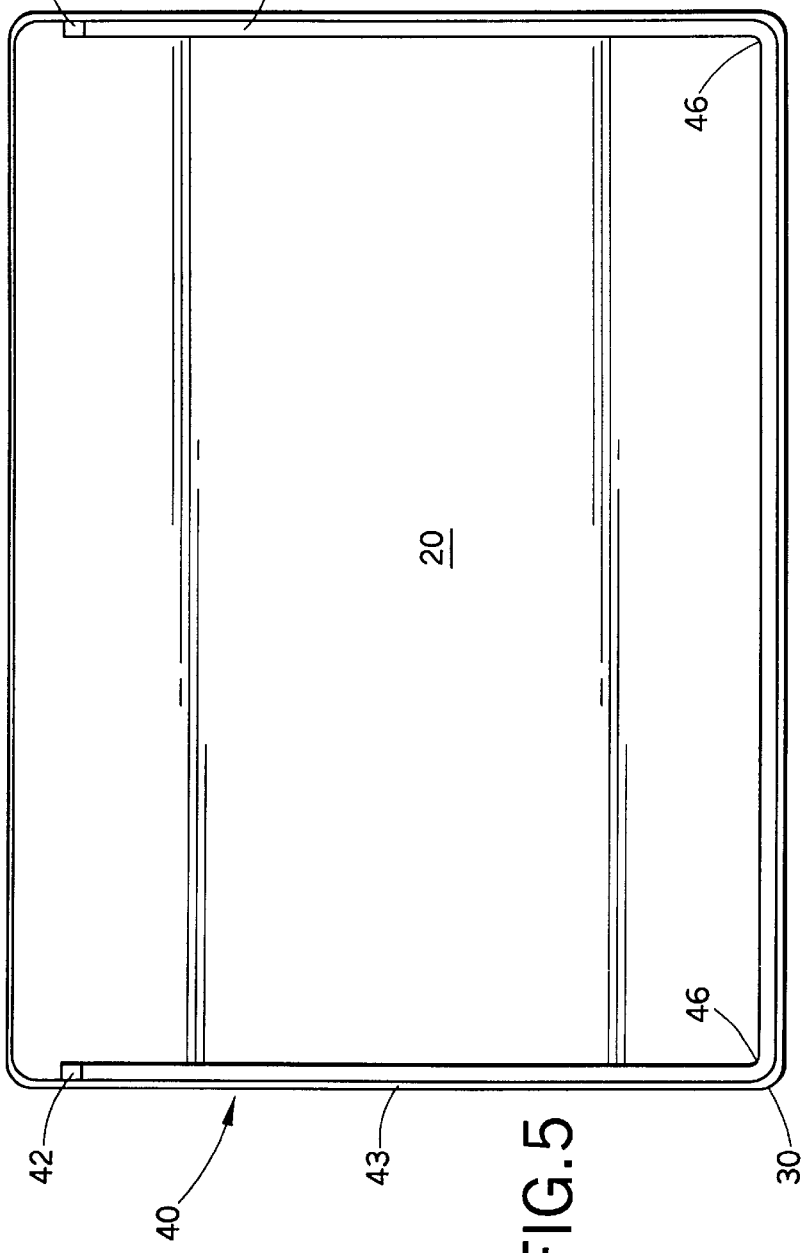
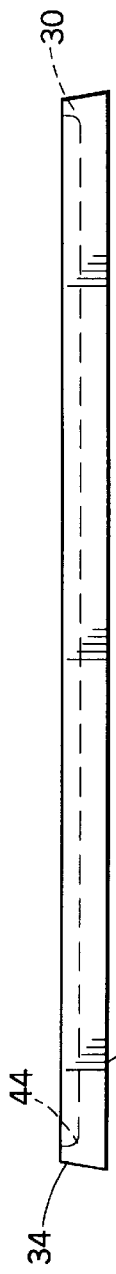

CUTTING BOARD WITH REPLACEABLE CUTTING SURFACE

BACKGROUND OF THE INVENTION

The present invention pertains to the art of food preparation and more particularly to a cutting board with a replaceable cutting surface.

Wooden cutting boards are commonly used for food preparation and provide an acceptable cutting surface which does not cause dulling of knives and prevents food from slipping on the cutting surface. However, wooden cutting boards have a porous surface which may absorb various foods and fluids. These surfaces are thus difficult to disinfect.

In order to provide a cutting board which is more easily disinfected, cutting boards are being made of less porous materials including plastics and stone. The surface of the plastic cutting board is more easily washed and disinfected than wooden cutting boards. However, extended use can tend to trap food particles and fluids which can allow bacterial growth. Grooves, cuts and scratches harbor bacteria and dirt and also stain and discolor the plastic boards. Therefore, it is recommended that plastic cutting boards be replaced periodically. Still, due to the expense of replacing the plastic cutting boards, they are not replaced as often as they should to provide sanitary food preparation conditions.

In addition, it is advisable to use different cutting surfaces for preparing different classes of food to avoid cross contamination. For example, raw vegetables should not be prepared on the same surface as uncooked meat. Cooked meat should not be sliced on surfaces that have been exposed to raw meat. Ideally, different surfaces should be used for different food preparation tasks, but it is expensive to purchase separate cutting boards for each task.

SUMMARY OF THE INVENTION

The present invention contemplates a new and improved cutting board with a replaceable cutting surface or skin which can be removed and replaced when it has become worn to provide a sanitary cutting surface. The base board on which the cutting surface is supported may be reused for an extended period of time.

A cutting board is comprised of a rigid, durable base board and a skin layer. The skin layer is selectively removable from and substantially thinner than the base board provides a cutting surface. A downwardly extending skirt is adapted for receipt adjacent a side periphery of the base board. The skin layer is securely held on the base board.

A cutting board assembly comprises a rigid base member composed of a material suited for food service. The base has a flat level upper surface. A selectively removable skin layer which includes a cutting surface is laminarly received over the base to provide a cutting surface. The skin layer includes a downward extending skirt that provides a snug fit alone a perimeter of the base member. A curb extends upwardly from the cutting surface adjacent an outer edge thereof to provide a trap for inhibiting food or juices from sliding off the cutting surface during use.

A cutting board assembly comprises a rigid base board configured to hold a replaceable skin member thereon. The base board provides a means for supplying traction along its bottom surface. A replaceable skin member that is substantially thinner than the base member has a cutting surface on the upper side and a skirt extending down from an outer perimeter of the cutting surface. The skirt is adapted to be received over the outer side walls of the base board. A curb extends up from the skin member to impede substances from flowing off the cutting surface during use.

An advantage of the present invention is found in the fact that it is cost effective to replace a cutting surface without incurring the expense of replacing an entire cutting board.

Another advantage of the present invention is that various cutting surfaces can be interchanged to avoid cross contamination among different food groups.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIG. 2 is a top view of the base board.

FIG. 3 is a front side elevational view of the base board of FIG. 2.

FIG. 4 is a right side elevational view of the base board of FIG. 2.

FIG. 5 is a top view of the skin layer.

FIG. 6 is a front side elevational view of the skin layer of FIG. 5.

FIG. 7 is a right side elevational view of the skin layer of FIG. 5.

DETAILED DESCRIPTION OF THE PREFERRED EMBODIMENT

Figure 1:
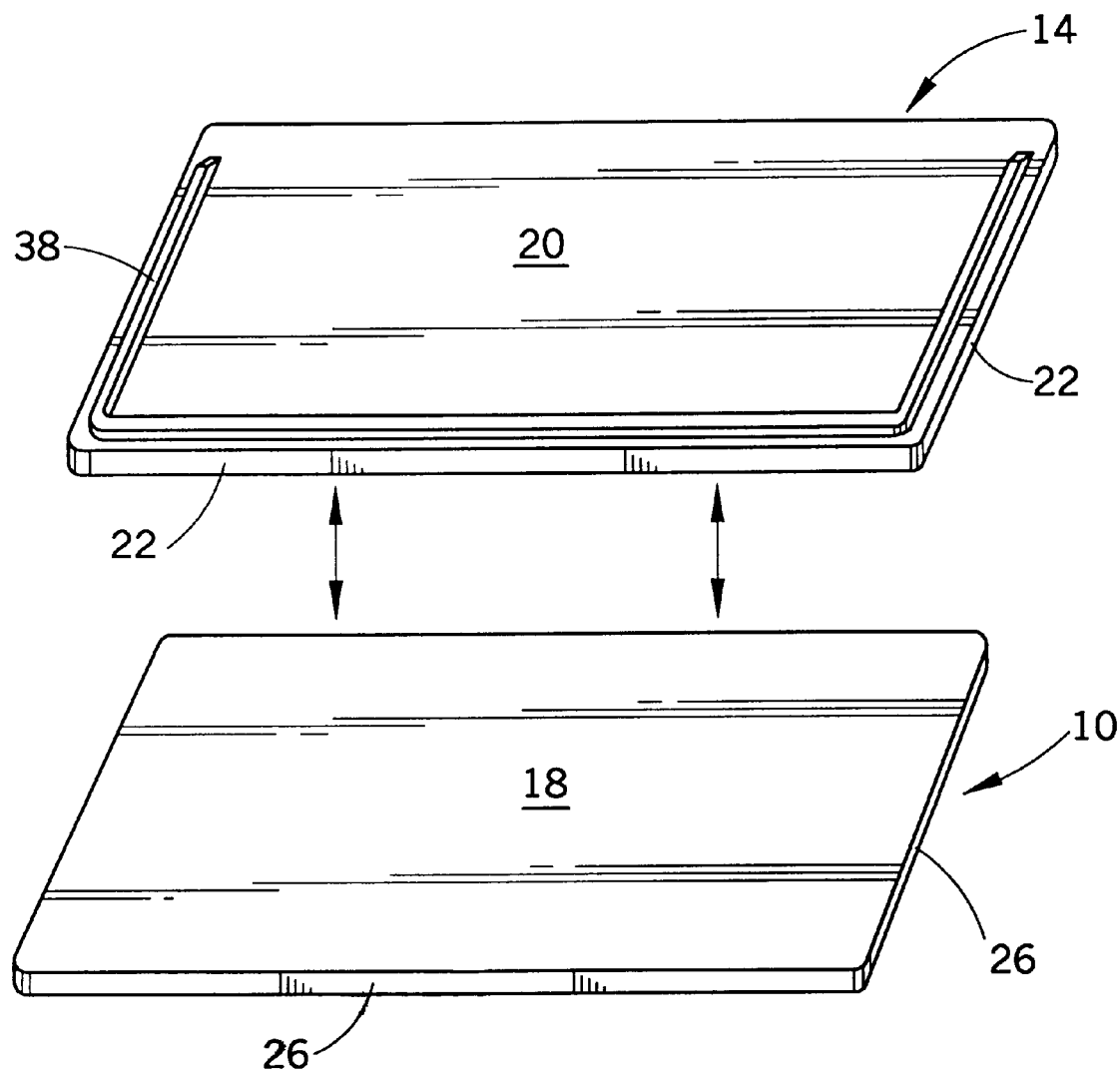
FIG. 1 is an exploded perspective view of a base board and skin layer in accordance with the present invention.

Referring now to the drawings wherein the showings are for purposes of illustrating the preferred embodiment only and not for purposes of limiting the invention, FIG. 1 shows an exploded perspective view of the cutting board assembly of the present invention. Base member or base board 10 is suited to receive a replaceable skin layer or skin member 14 thereon. The skin layer can be easily removed from the base board simply by lifting it up from the board. The skin can be scrubbed and sanitized as needed. After it becomes dirty and soiled to a point where it will no longer become acceptably clean, it can be discarded and a new cutting surface can be used. The base board can be used indefinitely as a support for different cutting surfaces.

In the alternative, different skin layers can be designated for different food group classifications and interchanged as needed. For example, cutting surfaces can be color coded to coincide with different food groups. The colors can be along the following line: Green for produce, blue for raw fish, red for raw meat, yellow for raw poultry and brown for cooked or ready to eat foods. After raw vegetables are chopped on a green color coded skin layer, the surface can simply be lifted from the base, and a different color coded surface can be applied so that another food, such as raw meat, can be prepared. The same base board is used for each of these tasks.

As shown in FIG. 1, the cutting board assembly includes a base board 10 having a substantially smooth, continuous top surface 18. A replaceable skin layer 14 is mounted on the top of the base board and includes a smooth continuous bottom surface that meets with the base board top surface 18 in a flat, smooth layered fashion. The replaceable skin layer that includes cutting surface 20 can be adhered to the base board, for example, by a pressure sensitive adhesive, mechanical locking member, or other means. Preferably, the replaceable skin layer can be placed on the base board without fixing the cutting surface to the board in any manner and the cutting surface will remain in place due to the configuration of the skin layer. In particular, a skirt member 22 extends downward from the skin layer cutting surface 20 to provide a fit over the base board sides 26, much like a box lid fits over a box. The skirt prevents the skin layer from sliding side to side relative to the base board.

With attention now to FIGS. 2–4, the base board 10 is shown to have a smooth top surface 18 as well as a smooth bottom. The base board is formed of a substantially rigid and durable material such as wood or plastic, or any other suitable material that is approved for use in conjunction with food service. This would include stainless steel. Preferably, the base board is formed of a plastic material such as stress relieved high density polyethylene. This material is FDA approved. A means for providing traction can be included on the base board. Preferably, rubber feet 28 can be attached to a bottom of the base board to provide traction against sliding during cutting board use. The rubber feet are preferably fastened to the base board using stainless steel screws. Adhesives can be used to affix the traction feet, though at least some types of adhesives will deteriorate over time. Other forms of traction are contemplated, including the use of spaced rubber treads or a rubber grip. Traction means mounted directly on the base board impedes the cutting board assembly from sliding during use. Wet towels and rubber or olefin sheets are known for providing a non-slip effect between a smooth cutting surface and a counter top. Providing traction means directly on the base board is an improvement over these prior methods. Wet towels can harbor bacteria, and this is undesirable as it can lead to disease and the like. The rubber or olefin sheets add an unnecessary expense that is eliminated with built in traction.

The replaceable skin layer or cutting surface 14 is shown in FIGS. 5–7. It is molded from a plastic material which is preferably a high-density polyethylene. The removable cutting surface has a weight that is approximately one sixth that of the base board, and a thickness that is preferably between 0.01 and 0.3 inches, more preferably between approximately 0.04 and approximately 0.08 inches.

The cutting surface preferably has a matte finish in comparison to the base board which is smooth. The skin layer is of slightly larger dimension than the base board dimension. For example, if the base board has the dimensions of 12×18 inches, the face of the cutting surface upper dimension is roughly 12.15×18.15 inches.

Skirt 22 extends down from the edges 30 of the skin layer. The skirt is sufficiently long to cover the base board sides 26. The skirt tapers out slightly from the face at approximately a 5 degree angle such that a lower edge 32 of the skirt is slightly greater than the length of the skirt at the upper edge 34 where it meets the face 24 of the skin layer. The slightly outwardly angled skirt makes it easy for the base board to slidingly receive the skin layer thereon. The skirt provides a reasonably snug fit so that the cutting surface is substantially secure during use, but also so that it can be lifted from the base quite readily. The tapered skirt also provides for ease of molding during manufacturing.

A continuous curb 38 extends upward from the face of the cutting surface 14 adjacent at least three sides thereof. The curb provides a stop for juices and food particles so that they do not slip or flow from the skin layer. The curb also provides integrity to the skin so that the skin does not distort from its flat shape. One edge 42 of the cutting surface does not have a curb. This allows for ease of transferring food to and from the cutting board.

The curb is tapered upward from the cutting board face at about 5 degrees to allow nesting of multiple skins during storage. The distal ends 42 of the curb are angled to meet the surface 20 for ease of cleaning and molding. The curb meets the face at curved intersection 44. A thin flange 43 is defined outside the curb along a perimeter of the cutting surface face and meets with the skirt 22. Corners 46 are likewise curved or eased to allow for cleaning and molding. The National Safety Foundation discourages the use of 90 degree angles on food surfaces because such angles are difficult to clean and provide an increased risk for bacteria growth.

The invention has been described with reference to the preferred embodiment. Obviously modifications and alterations will occur to others upon a reading and understanding of this specification. It is intended to included all such modifications and alterations insofar as they come within the scope of the appended claims or the equivalent thereof.

I claim:

1. A cutting board having a replaceable surface, comprising:
  a rigid, durable base board;
  an overlying abutting nonfixed skin layer that is selectively removable from and substantially thinner than the base board, the removable skin layer providing a cutting surface and including a substantially downward extending skirt adapted for receipt adjacent a side periphery of the base board in order to securely hold the skin layer on the base board.

2. The cutting board of claim 1, wherein the selectively removable skin layer further includes an upward extending curb for maintaining foods or juices on the cutting surface during use, the curb positioned adjacent an outer edge of the cutting surface.

3. The cutting board of claim 2 wherein the curb meets the cutting surface at curved corners.

4. The cutting board of claim 2 wherein the curb extends along a substantial portion of a periphery of the skin layer cutting surface but is not continuous about the entire periphery.

5. The cutting board of claim 1 wherein the selectively removable surface is comprised of a molded high density polyethylene.

6. The cutting board of claim 1 wherein the base board includes a means for providing traction.

7. The cutting board of claim 6 wherein the means for providing traction comprises at least one rubber foot.

8. The cutting board of claim 1 wherein the base is comprised of a polymer.

9. The cutting board of claim 1 wherein the skin layer is comprised of a polymer.

10. The cutting board of claim 9 wherein the skin layer comprises molded polyethylene.

11. A cutting board assembly, comprising:
  a durable rigid base member composed of a material suited for food service and having a flat level upper surface;
  an overlying abutting nonfixed molded polymeric skin layer adapted for selectively removable receipt on the base member, the skin layer having a laminar relation to the upper surface of the base member and providing a cutting surface on its upper side, the skin layer including a downwardly extending skirt for a snug fit along a perimeter of the base member and an upwardly extending curb adjacent an edge of the cutting surface.

12. The cutting board assembly of claim 11 wherein the rigid base member is composed of a high density polyethylene.

13. The cutting board assembly of claim 11 further including a means for supplying traction along a bottom surface of the base member to impede sliding.

14. The cutting board assembly of claim 11 wherein the downwardly extending skirt has a slight outward angle from 90 degrees.

15. The cutting board assembly of claim 11 wherein the skin layer is substantially thinner than the base member.

16. The cutting board assembly of claim 11 wherein the curb, skirt and cutting surface are integrally molded to form a single mold piece, the curb and cutting surfaces meeting at curved corners.

17. The cutting board assembly of claim 11 wherein the curb terminates to leave a significant segment of the cutting surface unbounded.

18. A cutting board assembly comprising:

a rigid polymeric base board configured to hold a replaceable skin member and providing a means for supplying traction along its bottom surface;

a replaceable polymeric skin member nonfixed to the base board and substantially thinner than the base board and having a cutting surface on its upper side and a skirt extending down from an outer perimeter of the cutting surface adapted to be received over outer side walls of the base board;

a curb extending up from the skin member to impede substances from flowing off the cutting surface during use.

19. The cutting board assembly of claim 11 wherein the skin layer is comprised of polyethylene.

* * * * *